United States Patent
Bild et al.

(10) Patent No.: US 10,912,053 B2
(45) Date of Patent: Feb. 2, 2021

(54) ENFORCING GEOGRAPHIC RESTRICTIONS FOR MULTITENANT OVERLAY NETWORKS

(71) Applicant: Xaptum, Inc., Chicago, IL (US)

(72) Inventors: David Robinson Bild, Chicago, IL (US); Mario Frank DeRango, Cary, IL (US)

(73) Assignee: Xaptum, Inc., Chicago, IL (US)

( * ) Notice: Subject to any disclaimer, the term of this patent is extended or adjusted under 35 U.S.C. 154(b) by 0 days.

(21) Appl. No.: 16/741,934

(22) Filed: Jan. 14, 2020

(65) Prior Publication Data

US 2020/0252898 A1 Aug. 6, 2020

Related U.S. Application Data

(60) Provisional application No. 62/799,471, filed on Jan. 31, 2019.

(51) Int. Cl.
*H04W 60/00* (2009.01)
*H04W 88/16* (2009.01)
(Continued)

(52) U.S. Cl.
CPC .......... *H04W 60/005* (2013.01); *H04W 8/04* (2013.01); *H04W 8/082* (2013.01);
(Continued)

(58) Field of Classification Search
CPC ....... H04W 12/06; H04W 4/38; H04W 84/18; H04W 12/08; H04W 24/10; H04W 4/33;
(Continued)

(56) References Cited

U.S. PATENT DOCUMENTS

| 5,410,475 A | 4/1995 | Lu |
| 5,978,386 A | 11/1999 | Hamaelaeinen |

(Continued)

FOREIGN PATENT DOCUMENTS

| EP | 0931418 A2 | 7/1999 |
| EP | 1856602 A2 | 11/2007 |

(Continued)

OTHER PUBLICATIONS

Handley, et al., SIP: Session Initiation Protocol, Mar. 1999, www.rfc-base.org., RFC2543.

(Continued)

*Primary Examiner* — Kwasi Karikari
(74) *Attorney, Agent, or Firm* — Garlick & Markison; Gary W. Grube

(57) ABSTRACT

A method includes receiving, via a core network in accordance with a regional data routing plan, an affiliation request from a data source device based on a first level regional affiliation of the data source device and a first computing entity. The method further includes determining whether a second level regional affiliation is substantially equal to the first level regional affiliation. When the second level regional affiliation is not substantially equal to the first level regional affiliation, the method further includes identifying a second computing entity based on the second level regional affiliation and sending a notification message to the second computing entity regarding the data source device being affiliated with the second computing entity. The method further includes broadcasting a gateway message to the core network to change the regional data routing plan such that data from the data source device is routed to the second computing entity.

18 Claims, 8 Drawing Sheets

(51) Int. Cl.
*H04W 8/04* (2009.01)
*H04W 40/28* (2009.01)
*H04W 64/00* (2009.01)
*H04W 40/24* (2009.01)
*H04W 8/08* (2009.01)

(52) U.S. Cl.
CPC ......... *H04W 40/246* (2013.01); *H04W 40/28* (2013.01); *H04W 64/003* (2013.01); *H04W 88/16* (2013.01)

(58) Field of Classification Search
CPC ..... H04W 84/10; H04W 88/16; H04W 8/005; H04W 12/001; H04W 12/00505; H04W 12/00506
See application file for complete search history.

(56) References Cited

U.S. PATENT DOCUMENTS

| | | |
|---|---|---|
| 6,097,794 A | 8/2000 | Suffern |
| 6,430,184 B1 | 8/2002 | Robins |
| 6,651,099 B1 | 11/2003 | Dietz |
| 6,661,431 B1 | 12/2003 | Stuart |
| 6,667,700 B1 | 12/2003 | McCanne |
| 6,721,333 B1 | 4/2004 | Milton |
| 6,859,835 B1 | 2/2005 | Hipp |
| 7,120,790 B1 | 10/2006 | Lopresti |
| 7,319,847 B2 | 1/2008 | Xanthos |
| 7,590,715 B1 | 9/2009 | Raanan |
| 8,073,973 B2 | 12/2011 | McCann |
| 8,291,058 B2 | 10/2012 | Head |
| 8,321,434 B1 | 11/2012 | Ren |
| 9,887,911 B2 | 2/2018 | Pasam |
| 2002/0085575 A1 | 7/2002 | Smith |
| 2002/0176378 A1 | 11/2002 | Hamilton |
| 2003/0140140 A1 | 7/2003 | Lahtinen |
| 2004/0128552 A1 | 7/2004 | Toomey |
| 2005/0005145 A1 | 1/2005 | Teixeira |
| 2006/0092930 A1 | 5/2006 | Shah |
| 2006/0126510 A1 | 6/2006 | Russell |
| 2007/0195780 A1 | 8/2007 | Cabeca |
| 2008/0115149 A1 | 5/2008 | Rupp |
| 2009/0063625 A1 | 3/2009 | Bagepalli |
| 2009/0070779 A1 | 3/2009 | Wang |
| 2009/0097506 A1 | 4/2009 | Subrahmanyan |
| 2009/0168760 A1 | 7/2009 | Katis |
| 2009/0199210 A1 | 8/2009 | Smith, Jr. |
| 2009/0222590 A1 | 9/2009 | Van Aken |
| 2009/0323703 A1 | 12/2009 | Bragagnini |
| 2009/0323718 A1 | 12/2009 | Oren-Dahan |
| 2010/0023524 A1 | 1/2010 | Gladwin |
| 2010/0095367 A1 | 4/2010 | Narayanaswamy |
| 2010/0233961 A1 | 9/2010 | Holden |
| 2011/0070868 A1 | 3/2011 | Scholz |
| 2011/0145181 A1 | 6/2011 | Pandya |
| 2011/0228744 A1 | 9/2011 | Cai |
| 2011/0264657 A1 | 10/2011 | Hoffman |
| 2012/0102055 A1 | 4/2012 | Hu |
| 2012/0120967 A1 | 5/2012 | Ghiasi |
| 2012/0210426 A1 | 8/2012 | Yu |
| 2012/0253728 A1 | 10/2012 | Chamas |
| 2013/0094451 A1 | 4/2013 | Pavlovski |
| 2013/0111217 A1 | 5/2013 | Kopasz |
| 2013/0136127 A1 | 5/2013 | Hill |
| 2013/0211555 A1 | 8/2013 | Lawson |
| 2013/0304616 A1 | 11/2013 | Raleigh |
| 2013/0322626 A1 | 12/2013 | Yang |
| 2014/0006632 A1 | 1/2014 | Evens |
| 2014/0028462 A1 | 1/2014 | Lawson |
| 2014/0280829 A1 | 9/2014 | Kjendal |
| 2015/0156266 A1 | 6/2015 | Gupta |
| 2016/0119198 A1 | 4/2016 | Kfir |
| 2016/0210578 A1 | 7/2016 | Raleigh |
| 2016/0351036 A1* | 12/2016 | Saldin .................. G08B 25/008 |
| 2017/0026469 A1 | 1/2017 | Usgaonkar |
| 2017/0078195 A1* | 3/2017 | Raman .................. H04L 45/308 |
| 2018/0026873 A1 | 1/2018 | Cheng et al. |
| 2019/0132932 A1* | 5/2019 | Klecha ................ H04L 12/2809 |

FOREIGN PATENT DOCUMENTS

| | | |
|---|---|---|
| EP | 1446906 B1 | 12/2007 |
| WO | 0049481 A2 | 8/2000 |

OTHER PUBLICATIONS

International Search Report corresponding to International Patent Application Serial No. PCT/US14/19595, United States Patent and Trademark Office, dated Feb. 28, 2014; (4 pages).

International Written Opinion corresponding to International Patent Application Serial No. PCT/ US14/19595, United States Patent and Trademark Office, dated Feb. 28, 2014; (5 pages).

* cited by examiner

ENFORCING GEOGRAPHIC RESTRICTIONS FOR MULTITENANT OVERLAY NETWORKS

CROSS REFERENCE TO RELATED PATENTS

The present U.S. Utility patent application claims priority pursuant to 35 U.S.C. § 119(e) to U.S. Provisional Application No. 62/799,471, entitled "ENFORCING GEOGRAPHIC RESTRICTIONS FOR MULTITENANT OVERLAY NETWORKS," filed Jan. 31, 2019, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to data communication systems.

Description of Related Art

The use of computers to communicate text files, voice files, multimedia files, and even live data streaming is known. Most computers utilize the Internet protocol (IP) to communicate via the Internet. The Internet protocol is known to be the primary network communications protocol utilized on the Internet, where IP provides a network layer protocol in accordance with one or more industry standards such as transmission control protocol (TCP), user datagram protocol (UDP), and stream control transmission protocol (SCTP).

It is also known for computers to utilize a transport protocol on top of the network layer protocol to transport data between computing devices, where the transport protocol is in accordance with one or more industry standard session protocols such as hypertext transfer protocol (HTTP) and Message queue telemetry transport (MQQT). Further industry standards have resulted in a focus on so-called constrained devices where lower power devices and lossy networks may be joined by the Internet. One such resulting industry standard is the constrained application protocol (CoAP) which provides a service layer protocol over the session protocol HTTP over the network layer protocol UDP. Computers are generally required to understand the protocol and data format from the various devices connected to the same network.

BRIEF DESCRIPTION OF THE SEVERAL VIEWS OF THE DRAWING(S)

DETAILED DESCRIPTION OF THE INVENTION

Figure 1:
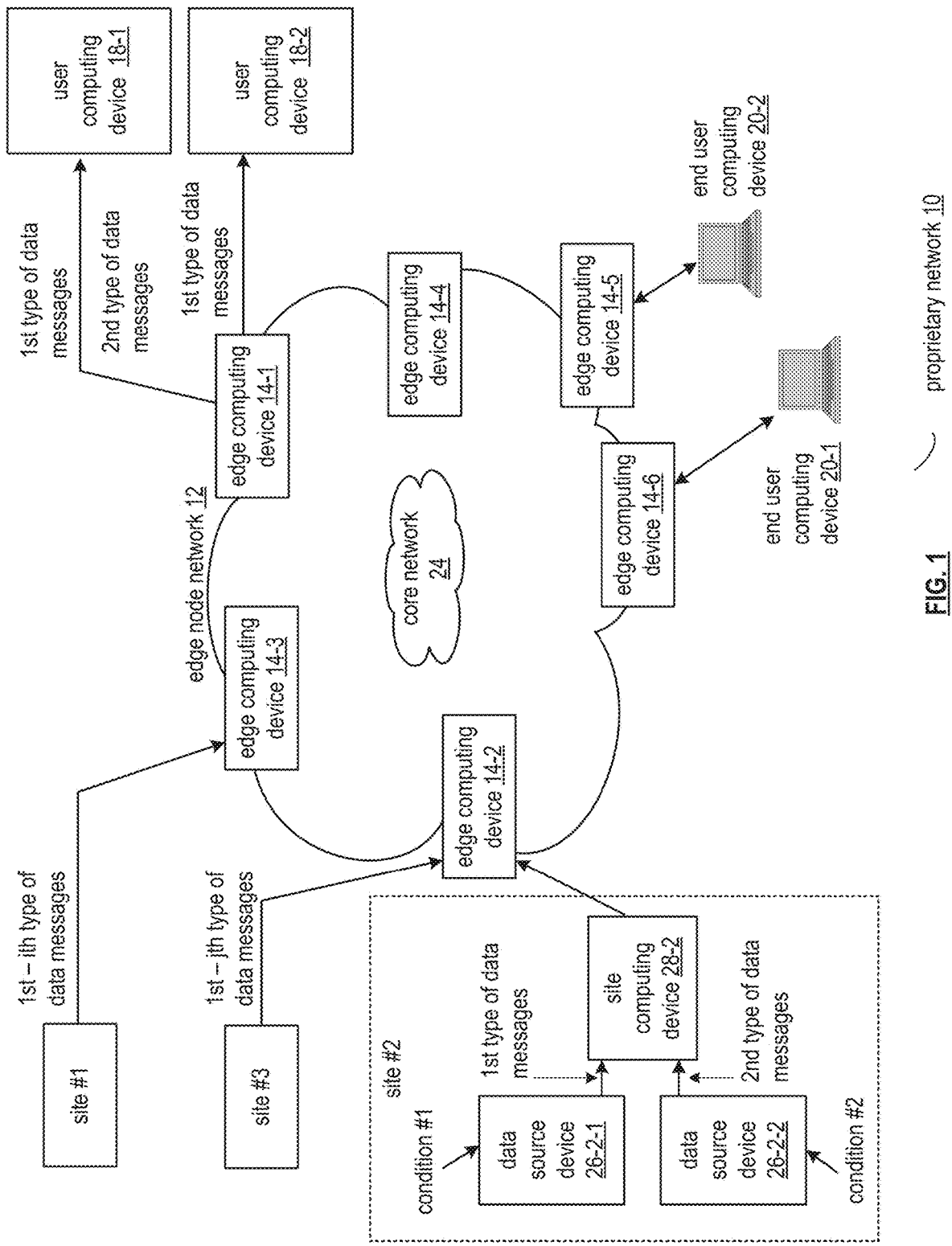
FIG. 1 is a schematic block diagram of an embodiment of a proprietary network in accordance with the present invention.

FIG. 1 is a schematic block diagram of an embodiment of a proprietary network 10 that includes an edge node network 12, a plurality of sites #1 through #3, a core network 24, a plurality of user computing devices 18-1 through 18-2, and a plurality of end user computing devices 20-1 through 20-2. The core network 24 includes at least one of the Internet, a public radio access network (RAN), and any private network. The edge node network 12 includes a plurality of edge computing devices 14-1 through 14-6 which utilize the core network 24 to communicate with each other.

Alternatively, the edge computing devices may communicate directly with each other by utilizing various access technologies including one or more of T-carrier/E-carrier (T1/E1), Digital Subscriber Line (DSL), Metro Ethernet, Hybrid Fiber Coax (HFC), and optical fiber. For instance, a transport protocol such as Multiprotocol Label Switching (MPLS), Asynchronous Transport Mode (ATM), or frame relay provides communications between distant edge computing devices over the access technology.

The sites include one or more data source devices and a site computing device for monitoring various conditions within a geographic area associated with each site. Each site may be associated with at least a portion of a facility (e.g., a home, an apartment, a store, a school, a hospital, a hotel, an office, a factory, a refinery, a farm plot, an airport, a water treatment plant, electrical generation and/or transmission complex, an oil exploration facility, etc.). For example, site #2 includes site computing device 28-2 and data source devices 26-2-1 and 26-2-2.

Each data source device is capable of detecting at least one condition, generating data based on the condition (e.g., on both a continual basis or when requested), and sending the data as data messages to an associated site computing device. The site computing device temporary stores and shares, via the edge node network 12, the data messages with various user computing devices and end user computing devices. The site computing device determines which of the various user computing devices and end user computing devices to share the data with based on authorized requests for the data and a common responsibility list.

The data includes one or more of sensor data associated with the condition of a local environment (e.g., a site) and use data (e.g., statistical usage data, user identifiers, error messages, alerts, warnings, level information, etc.) associated with a mechanism (e.g., a machine, a local computer, etc.). The sensor data further includes raw sensor data (e.g., directly from the sensor) and an interpretation of the raw sensor data (e.g., a summary, a result of applying an algorithm to the raw sensor data). The data still further includes data retrieved from a memory device associated with the data source device and any other data produced by the data source device.

The data source device generates the data messages by type. The type includes an association with a particular type of data such as error code data, weather data, smart grid control data, etc. The various types of data are associated with various priority levels. The priority level includes an absolute priority level and a relative priority level (e.g., two other data types). The priority level is utilized to establish a performance level of sending the data messages from the data source device to the user computing device (e.g., user computing devices and end user computing devices).

The performance includes a variety of performance factors associated with delivery of the data messages. The performance factors include transmission speed (e.g., transmission latency) and transmission bandwidth (e.g., message capacity) through the proprietary network 10. In a first embodiment of prioritizing performance, a priority level for a particular data type has an associated desired performance level. For example, when the data is of a first type of data message (e.g., real-time smart grid information), the transmission latency has a desired transmission time (e.g., a goal for an elapsed time from receipt of the data message to delivery of the data message to the user computing device) of 20 ms. As another example, when the data is of a second type of data message (e.g., home appliance usage information), the transmission latency has a second desired transmission time of 200 ms.

In a second embodiment of prioritizing performance, the desire performance level is a function of a requirement of the recipient computing device. For example, the user computing device 18-1 has a desired transmission time for the first type of data messages (e.g., the real-time smart grid information) of 20 ms and the user computing device 18-2 has a desired transmission time for the same first type of data messages of 50 ms.

The edge computing devices of the edge node network 12 route the requests for the data from the user computing devices and the end user computing devices to the site computing devices. The edge computing devices further routes the data from the site computing devices to the user computing devices and end user computing devices associated with the requests for the data and the common responsibility list.

The routing by the edge computing devices is based on various authentication and authorization techniques to ensure that only authorized user computing devices (e.g., end user computing devices and/or user computing devices) are allowed to access data from the data source devices. Thus, the edge node network 12 provides additional data transport security beyond the core network 24.

The user computing devices 18-1 and 18-2 request the data and process the data to produce process data. The processing of the data includes executing various data applications utilizing the data, storing the data, utilizing the data as inputs to an operational control system to provide a service, and using the data in a hosted data application. The requesting of the data is in accordance with needs of the various applications and services.

The end user computing devices 20-1 and 20-2 request the data and further request results of processing of the data by the user computing devices. For example, the end user computing devices control the various data applications hosted by the user computing devices and receive results of execution of the data applications (e.g., receive processed data).

The site computing devices, edge computing devices, user computing devices and end user computing devices may be implemented with a computing entity. A computing entity includes a cluster of one or more computing devices. For example, a first computing entity may be implemented to include the site computing device 28-2 and the edge computing device 14-2.

Figure 2:
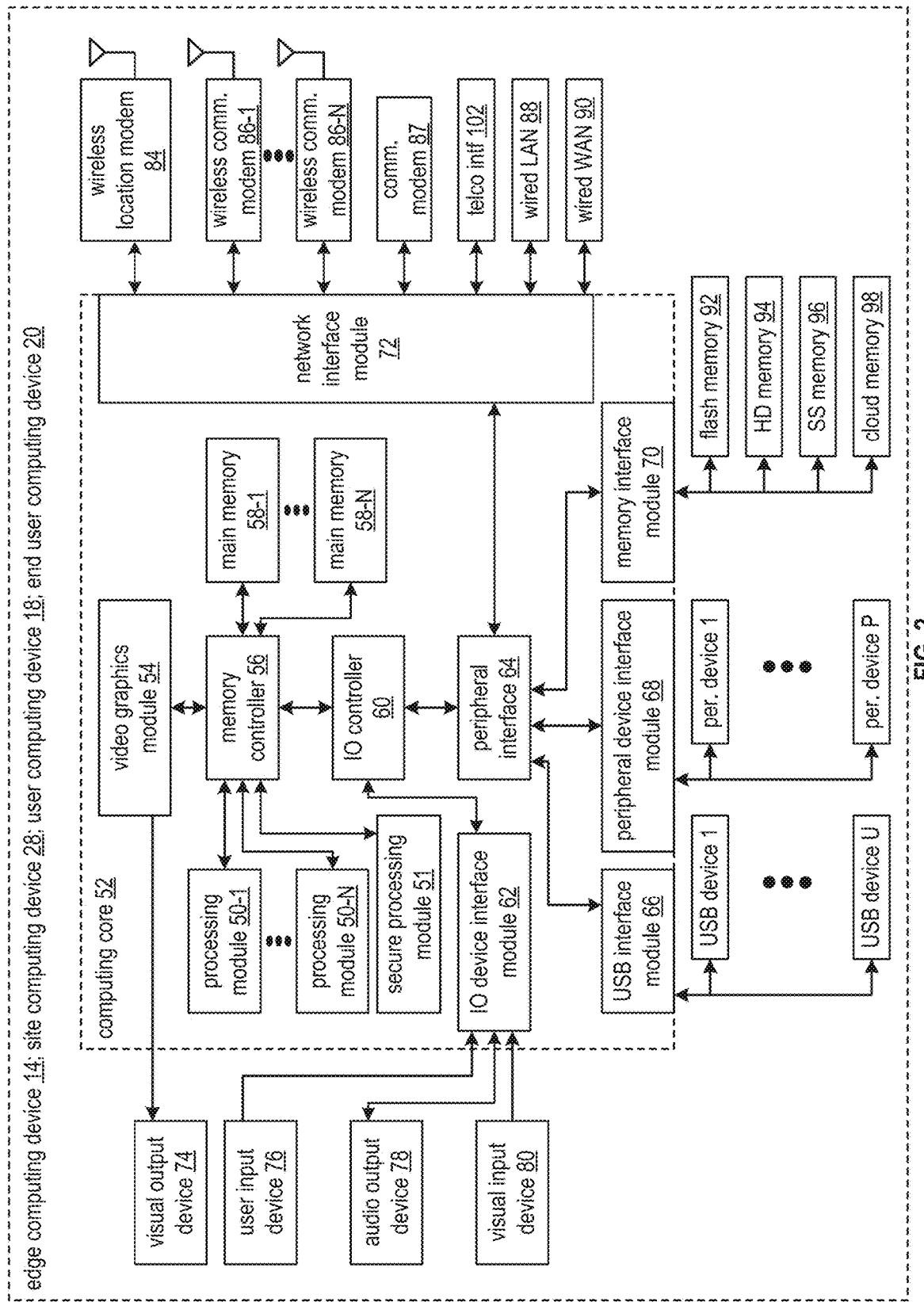
FIG. 2 is a schematic block diagram of various computing devices of a proprietary network in accordance with the present invention.

Each computing device includes one or more computing cores and each computing core includes one or more processing modules along with memory and input/output support devices and/or modules as illustrated in FIG. 2. In general, a computing core is any electronic device that can communicate data, process data, and/or store data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices include a personal computer (PC), a computer server, a cable set-top box, a satellite receiver, a television set, a printer, a home appliance, home entertainment equipment, a security camera controller, a video game console, a critical infrastructure controller, and/or any type of home, office or cloud computing equipment that includes a computing core.

The proprietary network 10 generally supports secure routing of the data from the sites to the user computing devices based on security procedures, synchronization parameters, and configuration information. For example, a first computing entity receives the data from a data source device and forwards the data to an intermediate computing entity of the edge node network 12 in accordance with a local copy the common responsibility list. The intermediate computing entity further forwards the data to a second computing entity in accordance with another local copy the common responsibility list. The second computing entity forwards the data to a user computing device in accordance with yet another local copy the common responsibility list.

Each computing entity has a particular responsibility to a user computing device with regards to the forwarding of the data. For example, the second computing entity is responsible for processing data (e.g., subscription) requests from the user computing device to update its local copy of the common responsibility list and to update other computing entities of the requests. All of the computing entities are further responsible for forwarding subscribed data to the user computing device in accordance with a local copy of the common responsibility list.

The security procedures includes identifying computing devices, challenging identity through authentication, producing encryption keys, securely exchanging authentication information, encrypting computing device identifiers, and encrypting data for transmission, while preserving device anonymity when desired. The encrypting of the data includes utilization of encryption keys with an encryption algorithm.

The synchronization parameters include one or more of control information, configuration information, and analytics information. The control information includes operational mode information and routing information (e.g., routes). The operational mode information includes how a computing device is to operate, i.e. as an edge computing device and/or as a site computing device. The operational mode information further includes which functions are to be supported by the computing device (e.g., routing, security, ingress support, egress support, pass-through support).

The configuration information includes deployment information, software information, security information, routing information, addressing information, protocol information, and presence information. The deployment information includes lists of logical connection paths between edge computing devices, data source devices associated with a particular edge computing device or site computing device, data source devices associated with particular user computing devices, data source devices associated with particular applications and/or storage facilities of a particular user computing device, etc.

The software information includes software version lists and software for site computing devices and edge computing devices. The security information includes public-private encryption keys, key generation values, key seeds, key identifiers, encryption algorithm identifiers, updated encryption algorithms, hardware-embedded secret keys, etc.

The routing information includes status of routes between edge computing devices, physical links between edge computing devices, etc. The addressing information includes identifiers of data source devices, identifiers of site computing devices and edge computing devices, and identifiers of sites, etc.

The protocol information includes desired protocol(s) for an application supported by the user computing devices 18-1 and 18-2, data protocol identifiers associated with messages that traverse the edge node network 12 carrying data and more, and data protocols supported by the data source devices, etc. The presence information includes real-time status of computing devices of the proprietary network 10 and historical status information of the computing devices.

The analytics information includes summaries of use of the proprietary network 10 and portions of the data. The summaries include a list of data types of the data being communicated on the proprietary network 10, historical patterns of the data type communication, and historical usage patterns of the proprietary network 10 to communicate data on behalf of each data source device, etc. The portions of the data include random samples of data, targeted samples of the data, and data associated with a particular historical pattern.

FIG. 2 is a schematic block diagram of various computing devices of the proprietary network 10 of FIG. 1. In an embodiment, the edge computing devices 14, the site computing devices 28, the user computing devices 18, and the end user computing devices 20 include a computing core 52, one or more visual output devices 74 (e.g., video graphics display, touchscreen, LED, etc.), one or more user input devices 76 (e.g., keypad, keyboard, touchscreen, voice to text, a push button, a microphone, etc.), one or more audio output devices 78 (e.g., speaker(s), headphone jack, a motor, etc.), and one or more visual input devices 80 (e.g., camera, photocell, etc.).

The computing devices further include one or more universal serial bus (USB) devices (USB devices 1-U), one or more peripheral devices (e.g., peripheral devices 1-P), and one or more memory devices (e.g., one or more flash memory devices 92, one or more hard drive (HD) memories 94, one or more solid state (SS) memory devices 96, and/or cloud memory 98). The computing devices further include one or more wireless location modems 84 (e.g., global positioning satellite (GPS), Wi-Fi, angle of arrival, time difference of arrival, signal strength, dedicated wireless location, etc.), and one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.).

The computing devices further include a telco interface 102 (e.g., to interface to a public switched telephone network), a wired local area network (LAN) 88 (e.g., optical, electrical), a wired wide area network (WAN) 90 (e.g., optical, electrical), and a communication modem 87 (e.g., facilitating wireless and/or wireline communications of data)

The computing core 52 includes a video graphics module 54, one or more processing modules 50-1 through 50-N, a secure processing module 51 (e.g., storing keys and executing encryption algorithms), a memory controller 56, one or more main memories 58-1 through 58-N (e.g., RAM as local memory), and one or more input/output (I/O) device interface modules 62. The computing core 52 further includes an input/output (I/O) controller 60, a peripheral interface 64, one or more USB interface modules 66, one or more network interface modules 72, one or more memory interface modules 70, and/or one or more peripheral device interface modules 68.

Each of the interface modules 62, 66, 68, 70, and 72 includes a combination of hardware (e.g., connectors, wiring, etc.) and operational instructions stored on memory (e.g., driver software) that are executed by one or more of the processing modules 50-1 through 50-N and/or a processing circuit within the interface module. Each of the interface modules couples to one or more components of the computing devices. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

In other embodiments, the computing devices may include more or less devices and modules than shown in this example embodiment. The secure processing module 51 (e.g., a Trusted Platform Module (TPM)) includes a hardware module for securely generating and storing security parameters (e.g., encryption keys) when required for secure attestation and authenticated access to the edge node network 12 and cannot be tampered with by application software.

Figure 3:
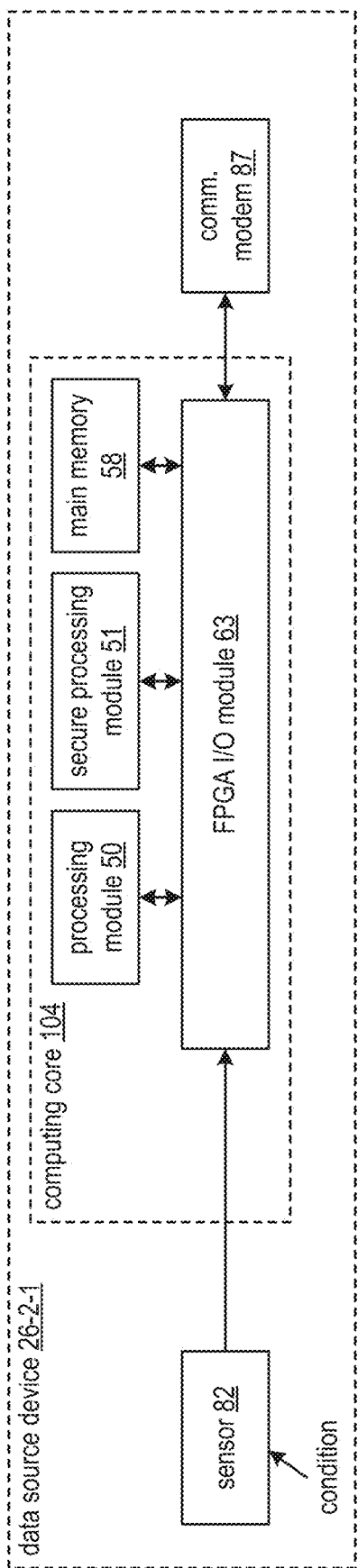
FIGS. 3 and 4 are schematic block diagrams of embodiments of a data source device of a proprietary network in accordance with the present invention.
Figure 4:
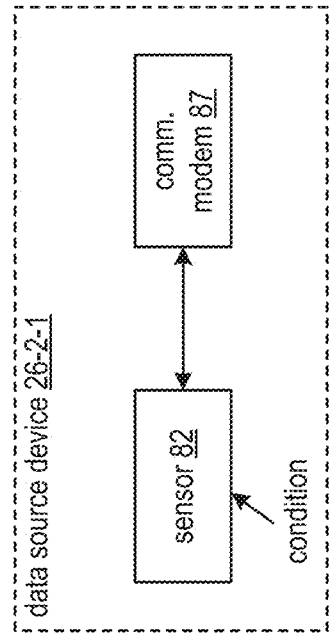

FIGS. 3 and 4 are schematic block diagrams of embodiments of a data source device of a proprietary network. FIG. 3 is a schematic block diagram of an embodiment of the data source device 26-2-1 of FIG. 1. The data source device 26 includes a sensor 82, a computing core 104, and the communication modem 87 of FIG. 2. The computing core 104 includes at least one processing module 50 of the processing modules 50-1 through 50-N of FIG. 2, the secure processing module 51 of FIG. 2, at least one main memory 58 of the main memories 58-1 through 58-N of FIG. 2, and one or more Field Programmable Gate Array (FPGA) input/output (I/O) modules 63. In other embodiments, the device may include more or less devices and modules than shown in this example embodiment. For example, two or more sensors 82. In other embodiments, the data source device 26 includes more or less devices and modules than shown in this example embodiment. For instance, the computing core 104 only includes the FPGA I/O module 63.

The sensor 82 interprets the condition to provide sensor data to the computing core 104. The computing core 104 generates data based on the sensor data of the condition and sends, via the communication modem 87, the data to an associated site computing device or other device. For instance, the processing module 50 controls the FPGA I/O module 63 to route the sensor data to the main memory 58 for temporary storage. The processing module 50 subsequently routes, via the FPGA I/O module 63, the temporarily stored sensor data from the main memory 58 to the secure processing module 51 for encryption to produce encrypted data. The encryption is performed utilizing a selected encryption algorithm and encryption key stored within the secure processing module 51.

Having facilitated encryption of the data, the processing module 50 further facilitates routing, via the FPGA I/O module 63, of the encrypted data from the secure processing module 51 to the communication modem 87 for transmission to the associated site computing device. Alternatively, the processing module 50 further facilitates routing, via the FPGA I/O module 63, the encrypted data from the secure processing module 51 to the main memory 58 for temporary storage until the communication modem 87 is ready to transmit the encrypted data.

FIG. 4 illustrates another embodiment of the data source device 26-2-1 of FIG. 3. The data source device 26-2-1 includes the sensor 82 of FIG. 3 and the communication modem 87 of FIG. 2. In an example of operation, the sensor 82 interprets the condition to produce the sensor data and sends the sensor data to the communication modem 87 for transmission to the associated site controller device, or other device, as one or more data messages.

Figure 5:
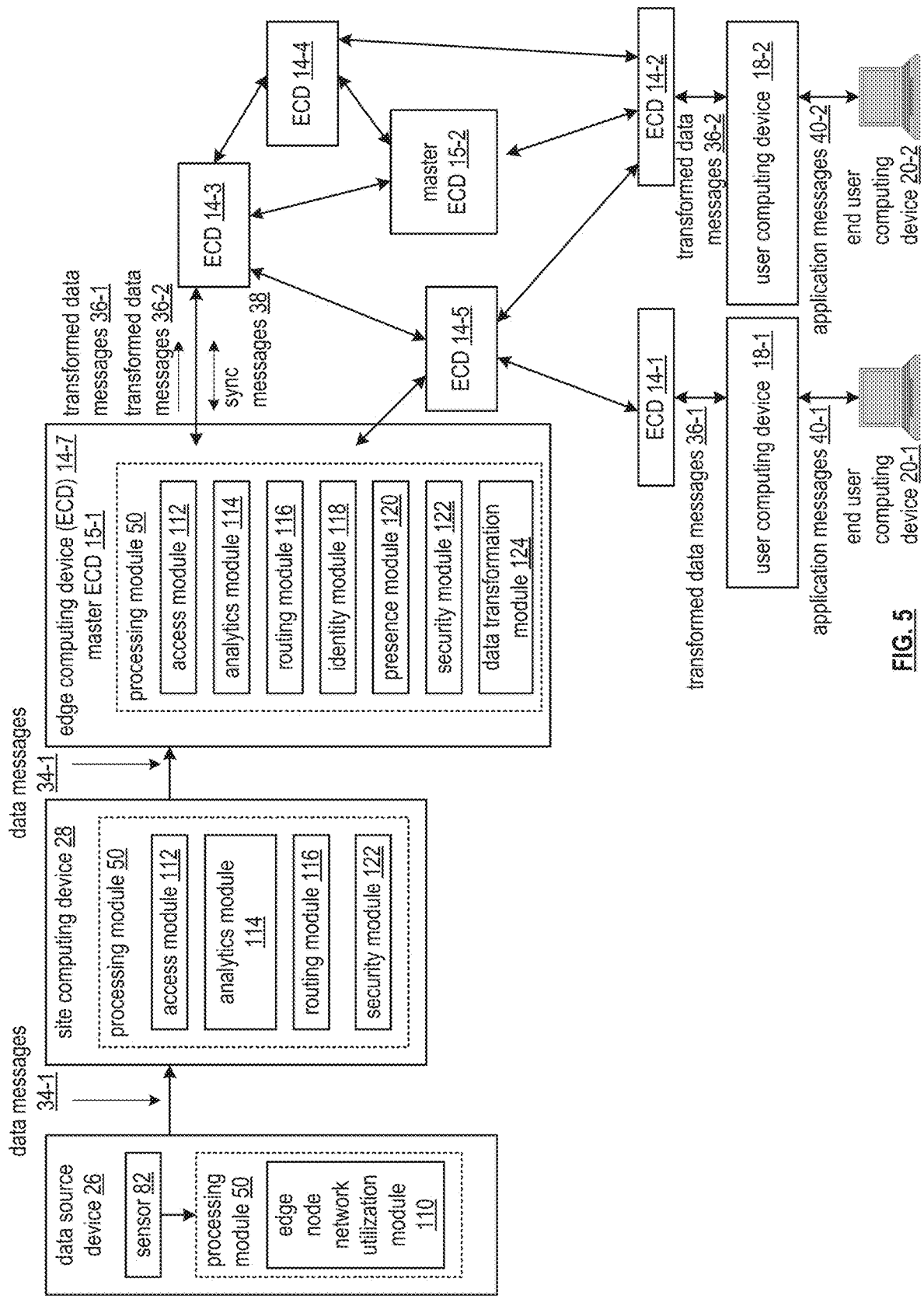
FIG. 5 is a schematic block diagram of another embodiment of a proprietary network in accordance with the present invention.

FIG. 5 is a schematic block diagram of another embodiment of a secure data network that includes a data source device 26, a site computing device 28, a plurality of edge computing devices 14-1 through 14-7, master edge computing devices 15-1 and 15-2, at least two user computing devices 18-1 and 18-2, and at least two end user computing devices 20-1 and 20-2. The data source includes data source device 26 may include one or more of the devices and the modules of the data source device 26-2-1 of FIG. 3. For example, the data source device 26 includes the sensor 82 and the processing module 50 of FIG. 3.

The processing module 50 of the data source device 26 includes an edge node network utilization module 110. The site computing device 28 includes the processing module 50 of FIG. 2. The processing module 50 includes an access module 112, a routing module 116, a security module 122, and an analytics module 114.

Each edge computing device of the plurality of edge computing devices 14-1 through 14-7 includes one or more of the devices and the modules of the computing devices of FIG. 2. For example, each edge computing device includes the processing module 50 of FIG. 2. The processing module 50 includes the access module 112, the analytics module 114, the routing module 116, an identity module 118, a presence module 120, the security module 122, and a data transformation module 124.

The edge node network utilization module 110 includes one or more of the functions associated with the edge computing devices 14-1 through 14-7. For instance, the edge node network utilization module 110 includes the access module 112, the identity module 118, and the security module 122. Each of the master edge computing devices 15-1 and 15-2 further operate to distribute any operational information required for the secure data network. For instance, information to establish routes and establish security credentials that is not readily available by the edge computing devices (e.g., a master routing table maintained by the master edge computing devices).

Generally, the modules 112-124 within the processing modules 50 of the data source device 26, the site computing device 28, and the edge computing devices 14-1 through 14-7 process (e.g., generate, store, utilize for decision-making, transfer) synchronization parameters within synchronization messages 38 to maintain operation of the secure data network. For example, functionality of the access module 112 includes causing the processing module 50 to utilize one or more of protocol information and configuration information to provide physical access to other nodes and/or devices.

Functionality of the analytics module 114 includes causing the processing module 50 to utilize the analytics information to optimize generation and transmission of data messages and transformed data messages. Functionality of the routing module 116 includes causing the processing module 50 to utilize the routing information to optimize transmission of information through the edge computing devices.

Further examples of the processing include functionality of the identity module 118, which includes causing the processing module 50 to utilize the addressing information to identify which sensors are associated with which data source devices and which data source devices are to access which user computing devices. Functionality of the presence module 120 includes causing the processing module 50 to utilize the presence information to optimize utilization of various edge nodes to optimize data traffic routes between the data source device and a corresponding user computing device. Functionality of the security module 122 includes causing the processing module 50 to utilize security information to authenticate a desirable and valid connection between edge computing devices and data source devices and to protect confidential information exchange between the edge computing devices and data source devices.

Functionality of the data transformation module 124 includes causing the processing module 50 to utilize the protocol information to convert portions of the data messages into the transformed data messages to support multiple desirable attributes of the secure data network. The desired attributes include a favorable security level, a favorable efficiency level, a favorable data latency level, and a favorable compatibility level with numerous data protocols associated with data applications of the user computing devices.

In an example of operation of the secure data network, the edge computing devices 14-1 through 14-7, the site computing device 28, and the data source device 26 exchange synchronization messages 38 from time to time to develop and convey the synchronization parameters. For example, at least some the edge computing devices 14-1 through 14-7 convey, by exchanging with each other, at least some of the synchronization parameters to include one or more of the configuration information, the analytics information, the protocol information, the addressing information, the security information, the routing information, and the presence information. For instance, edge computing device 14-1 receives one or more of the synchronization patterns from the user computing device 18-1 for local storage within a memory of the edge computing device 14-1.

A trusted edge computing device control application of the user computing device 18-1 is affiliated with the plurality of edge computing devices 14-1 through 14-7. In another instance, edge computing device 14-1 generates a synchronization message 38 to include substantially all of the synchronization parameters and transmits the synchronization message 38 to the edge computing device 14-6 to update the synchronization parameters stored locally within a memory of the edge computing device 14-6.

As another example of the developing and conveying of the synchronization parameters, at least some of the edge computing devices 14-1 through 14-7, the site computing device 28, and the data source device 26 develop, by generating with each other (e.g., determining, modifying, updating, correcting, etc.), at least some of the synchronization parameters to include one or more of the configuration information, the analytics information, the protocol information, the addressing information, the security information, the routing information, and the presence information. For instance, the site computing device 28 exchanges limited security information (e.g., to lead to generation of a common secret encryption key) with the data source device 26 to further develop trusted security between the site computing device 28 and the data source device 26.

In another instance, the site computing device 28 receives configuration information from the data source device 26. The configuration information includes addressing information associated with the sensor 82. The site computing device 28 further receives companion configuration information from a data application associated with the user computing device 18-1 to match the sensor with the data application to generate further updated configuration information. In yet another instance, the edge computing device 14-7 monitors data messages received from the site computing device 28 to generate updated analytics information based on data attributes of data within the data messages (e.g., data types, data sizes, etc.).

Having developed and conveyed a sufficient number and sufficient level of the synchronization parameters to support ongoing operations, the secure data network facilitates communication of data from the sensor 82 to one or more corresponding data applications of the user computing devices 18-1 and 18-2. In an example of operation of the communication of the data, having established trust and security information between the data source device 26 and the site computing device 28, the site computing device 28 receives data messages 34-1 from the data source device 26. The edge node network utilization module 110 encodes data from the sensor 82 in accordance with a sensor data protocol to produce the data messages 34-1. The encoding of the data includes utilizing at least one of an industry standard sensor data protocol and a proprietary data protocol. The industry standard sensor data protocols include one or more of Message queue telemetry transport (MQQT), constrained application protocol (CoAP), and data distribution service (DDS).

Having received the data messages 34-1, the site computing device 28 identifies active data applications associated with the user computing devices 18-1 and 18-2 that are affiliated with the data source device 26 and/or the sensor 82 based on one or more of the addressing information and the configuration information. Having identified the active data applications, the site computing device 28 determines at least a portion of a route for transferring data associated with the data messages 34-1 to the user computing devices 18-1 and 18-2 based on one or more of the routing information and the presence information. Having determined the routing information, the site computing device 28 sends the data messages 34-1 to the edge computing device 14-7 in accordance with the routing information.

Having received the data messages 34-1, the edge computing device 14-7 determines whether to convert the data messages into transformed data messages based on one or more of the configuration information, the analytics information, the addressing information, and the protocol information. For instance, the edge computing device 14-7 determines to convert the data messages 34-1 from the sensor data protocol into first and second data message protocols when the protocol information indicates that the first and second data protocol messages are associated with the affiliated data applications of the user computing devices 18-1 and 18-2.

In another instance, the edge computing device 14-7 determines to convert the data messages 34-1 from the sensor data protocol into a third data message protocol. The determining includes selecting the third data message protocol when the analytics information indicates that data optimization (e.g., providing important data on a more timely basis, estimating missing data based on historical data, summarizing multiple data points, etc.) based on the an interpretation of a data attribute (e.g., actual data, frequency of data transmission, a data type, etc.) of the data messages 34-1 is associated with the third data message protocol and the configuration information indicates that user computing devices 18-1 and 18-2 are compatible with the third data message protocol.

Having determined to convert the data messages 34-1, the edge computing device 14-7 generates transformed data messages 36-1 and transformed data messages 36-2 from the data messages 34-1 based on attributes of the first and second data message protocols of the protocol information. Having generated the transformed data messages, the edge node 14-7 obtains the route for transferring the transformed data messages to the corresponding cloud services. The obtaining may include retrieving route information and updating the retrieve route information based on one or more of updated presence information, updated security information, and updated routing information.

In an instance of obtaining the route, the edge computing device 14-7 determines an updated route to include sending the transformed data messages to the edge computing device 14-3 when the updated presence information and updated routing information are favorable with regards to utilizing the edge computing device 14-3 and sending the transformed data messages 36-1 and 36-2 to the edge computing device 14-3. Alternatively, the edge computing device 14-7 transmits the transformed data messages 36-1 and 36-2 directly to the user computing devices 18-1 and 18-2 via the core network 24 of FIG. 1 when attributes of the routing information are favorable for that route.

Having received the transformed data messages 36-1, the edge computing device 14-1 facilitates forwarding of the transformed data messages 36-1 to the user computing device 18-1 for utilization by the corresponding data application affiliated with the data source device 26 and/or the sensor 82. Having received the transformed data messages 36-2, the edge computing device 14-2 facilitates forwarding of the transformed data messages 36-2 to the user computing device 18-2 for utilization by the corresponding data application affiliated with the data source device 26 and/or the sensor 82.

Having processed the transformed data messages 36-1, the user computing device 18-1 exchanges corresponding application messages 40-1 with the end user computing device 20-1. Having processed the transformed data messages 36-2, the user computing device 18-2 exchanges corresponding application messages 40-2 with the end user computing device 20-2.

FIGS. 6A, 6B, 6C, and 6D are schematic block diagrams of embodiments of a proprietary network illustrating methods for enforcing geographic restrictions for multitenant overlay networks. Restricting data storage to remain within a geographic region can be useful for supporting General Data Protection Regulation (GDPR) requirements. The proprietary network includes at least one data source device 26-1, computing entities 200-1 and 200-2, user computing devices 18-1 and 18-2 of FIG. 1, and the core network 24 of FIG. 1, organized between at least a first region and a second region of two or more regions. The data source device 26-1 may be implemented utilizing the data source device 26-2-1 of FIG. 1. In an embodiment, a multitude of data source devices are utilized.

The computing entities 200-1 and 200-2 include edge computing devices 14-1 and 14-2 of FIG. 1. Any number of computing entities and edge computing devices may be utilized to form the edge node network 12 of FIG. 1 of the proprietary network. In an embodiment, the core network 24 includes a variety of Internet service providers (ISPs) traversing the two or more regions.

Generally, the core network 24 supports industry-standard IPv4 and/or IPv6 routing and is utilized by the data source devices 26-1 for connectivity to a multitenant overlay service provided by the edge node network 12. The core network includes at least one border routers, which provides a secure internetworking routing interface to edge node network 12. Each border router supports border gateway protocol (BGP) for advertising routing reachability of IP subnets.

The user computing devices 18-1 and 18-2 support Internet of things (IoT) applications. The IoT applications consume and process sensor-driven data messages from the data source device 26-1 utilizing the multitenant overlay services of edge node network 12 to improve the performance and security of these data messages.

Figure 6A:
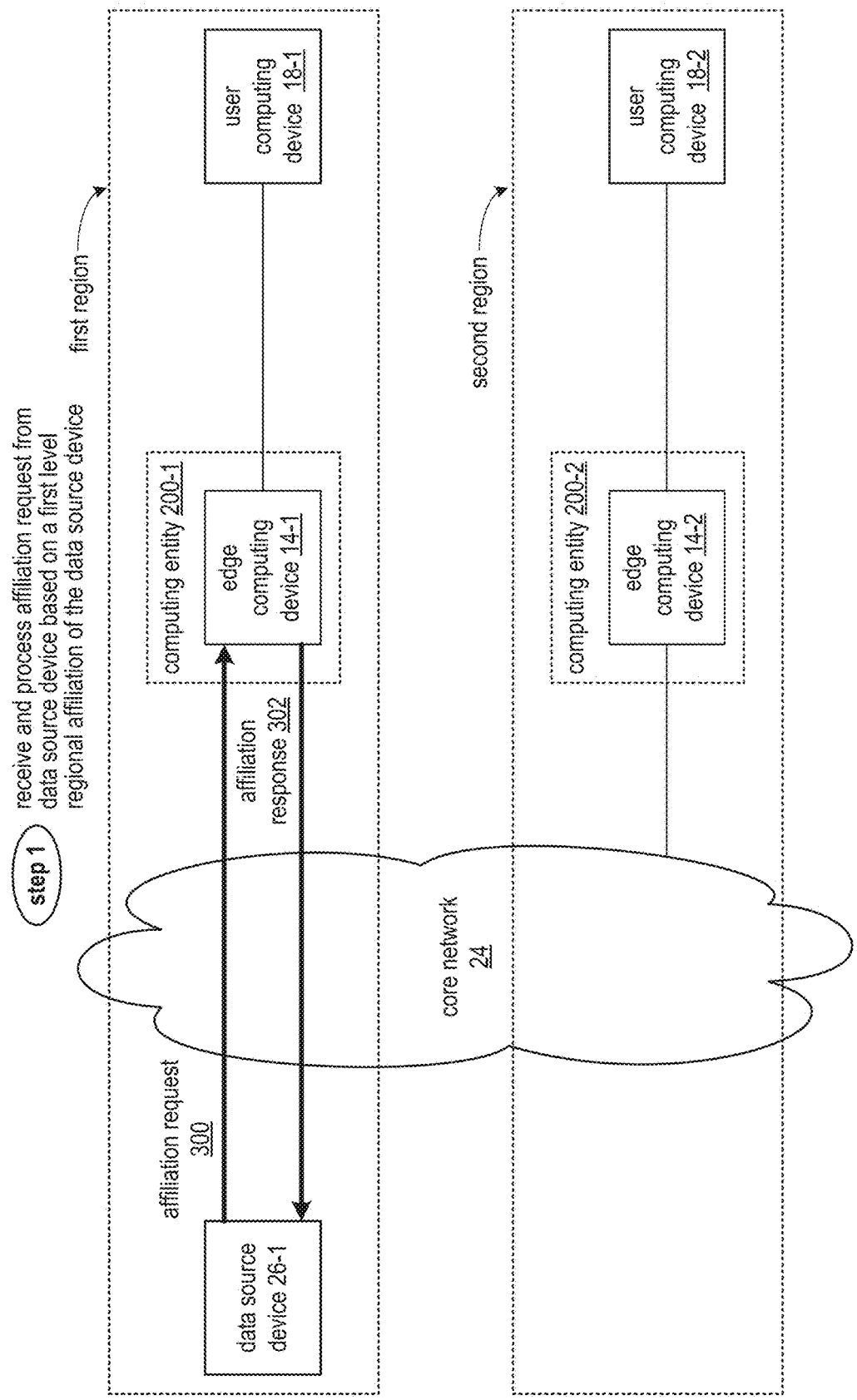
FIGS. 6A, 6B, 6C, and 6D are schematic block diagrams of embodiments of a proprietary network illustrating methods for enforcing geographic restrictions for multitenant overlay networks in accordance with the present invention.

FIG. 6A illustrates an example of steps of a method for enforcing geographic restrictions for multitenant overlay networks where a first computing entity 200-1 receives, via the core network 24 in accordance with a regional data routing plan, an affiliation request 300 from the data source device 26-1 based on a first level regional affiliation of the data source device 26-1 and the first computing entity 200-1. The affiliation request 300 includes one or more of an identifier of the data source device 26-1, a data group identifier, a data type identifier associated with the data source device 26-1, a home region identifier of the data source device 26-1, and a current location (i.e., region number) of the data source device 26-1. Alternatively, or in addition to, the first computing entity 200-1 receives a data message from the data source device 26-1 prior to receiving, if any, the explicit affiliation request 300. When receiving the data message, the first computing entity 200-1 interprets the data message as an implicit affiliation request 300 and processes the data message as described below.

The regional data routing plan dictates restrictions of data. The restrictions include a restriction by geographic region, a restriction by a data group, a restriction by a particular data source device, a restriction based on a home affiliation, a restriction by a type of data, or any other restriction that provides an improvement such as a security enhancement.

In an embodiment, the first level regional affiliation prescribes how affiliation requests are to be handled. For example, keeping affiliation message handling within a region associated with the data source device. For instance, the data source device 26-1 targets a registration service for the affiliation message handling that utilizes an anycast IPv6 address, that is readily carried by the core network 24 to the computing entity 200-1.

Having received the affiliation request 300, the computing entity 200-1 issues, via the core network 24, an affiliation response 302 to the data source device 26-1. The affiliation response 302 includes one or more of information of the affiliation request 300, an assigned region identifier for data from the data source device 26-1, an assigned data group identifier, and a target IP address range (e.g., a prefix) associated with a second level regional affiliation of the data source device and at least one computing entity and/or user computing device associated with an allowed region to receive data from the data source device 26-1. For example, the computing entity 200-1 generates the affiliation response 302 to indicate that the data source device 26-1 is to send subsequent data messages to the computing entity 200-2 associated with the second region when the data of the data messages is to be restricted to the second region in accordance with the original data routing plan.

Figure 6B:
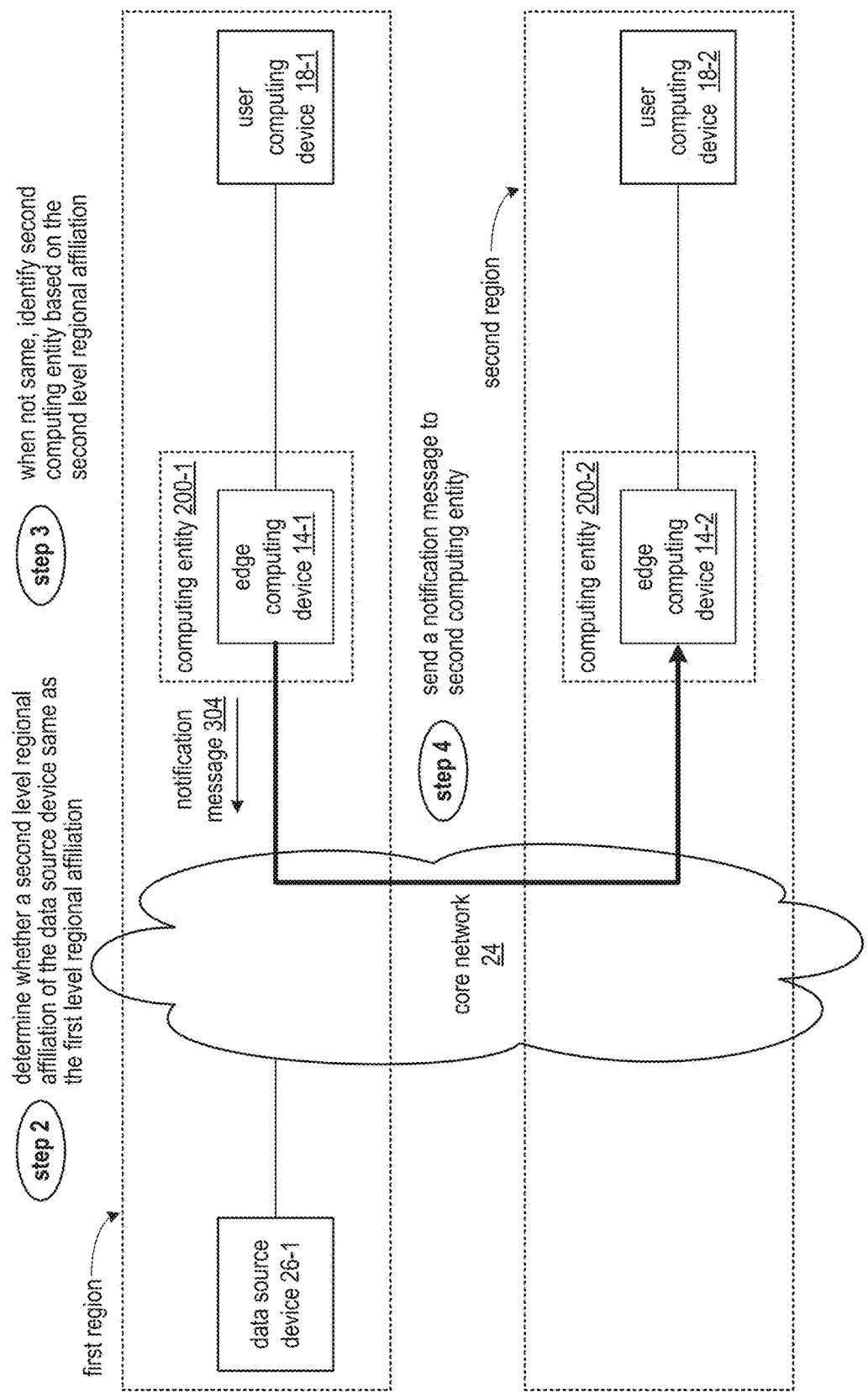

FIG. 6B further illustrates the example of the steps of the method for enforcing geographic restrictions for multitenant overlay networks. The computing entity 200-1 determines whether the second level regional affiliation of the data source device and the first computing entity (e.g., don't send data to the first computing entity, rather send the data to the second computing entity) is substantially equal to the first level regional affiliation (e.g., send affiliation requests to the first computing entity). The determining whether the second level regional affiliation of the data source device and the first computing entity is substantially equal to the first level regional affiliation includes a variety of alternatives.

A first alternative includes determining the second level regional affiliation based on one or more of a variety of factors including a geographic location of the data source device, a home geographic region of the data source device, a geographic region of the first computing entity, and a geographic region of the second computing entity. Further factors include a data storage restriction of a data type of the data from the data source device, another data storage restriction of the data from the data source device, and a data group associated with the data source device and a computing entity associated with the data group. For instance, the computing entity 200-1 determines the second level regional affiliation to include sending the data to the computing entity 200-2 when the type of data is temperature sensor data and the temperature sensor data is restricted to the second region.

A second alternative includes indicating that the second level regional affiliation of the data source device 26-1 and the computing entity 200-1 is not substantially equal to the first level regional affiliation when the second level regional affiliation indicates that the data from the data source device 26-1 is to be routed to the second computing entity. For instance, when the data is to be restricted to the second region.

A third alternative includes indicating that the second level regional affiliation of the data source device 26-1 and the computing entity 200-1 is substantially equal to the first level regional affiliation when the second level regional affiliation indicates that the data from the data source device 26-1 is to be routed to the computing entity 200-1. For instance, when the data is to be restricted to the first region.

Further alternatively, when the second level regional affiliation is not substantially equal to the first level regional affiliation, the computing entity 200-1 identifies the computing entity 200-2 based on the second level regional affiliation. For example, the computing entity 200-1 performs a table lookup where a table entry indicates that the data source device is affiliated with the second computing entity (e.g., the computing entity 200-2).

The identifying of the second computing entity based on the second level regional affiliation includes a variety of alternatives. A first alternative includes identifying a user computing device to receive the data from the data source device 26-1. For example, the user computing device 18-2 is identified to receive the data when the user computing device 18-2 is associated with the computing entity 200-2 (e.g., second computing entity).

A second alternative includes performing an edge computing device table lookup to identify an entry that associates the computing entity 200-2 with the second level regional affiliation. For example, the computing entity 200-2 is associated with the temperature sensor data of the second level regional affiliation.

A third alternative includes the computing entity 200-1 sending a notification message 304 to the computing entity 200-2 regarding the data source device 26-1 being affiliated with the computing entity 200-2. For example, the computing entity 200-1 generates the notification message 304 to indicate that the data source device 26-1 is affiliated with the computing entity 200-2 and/or to indicate that the data from the data source device 26-1 is to be routed to the computing entity 200-2. The computing entity 200-1 transmits the notification message 304 to the computing entity 200-2.

Figure 6C:
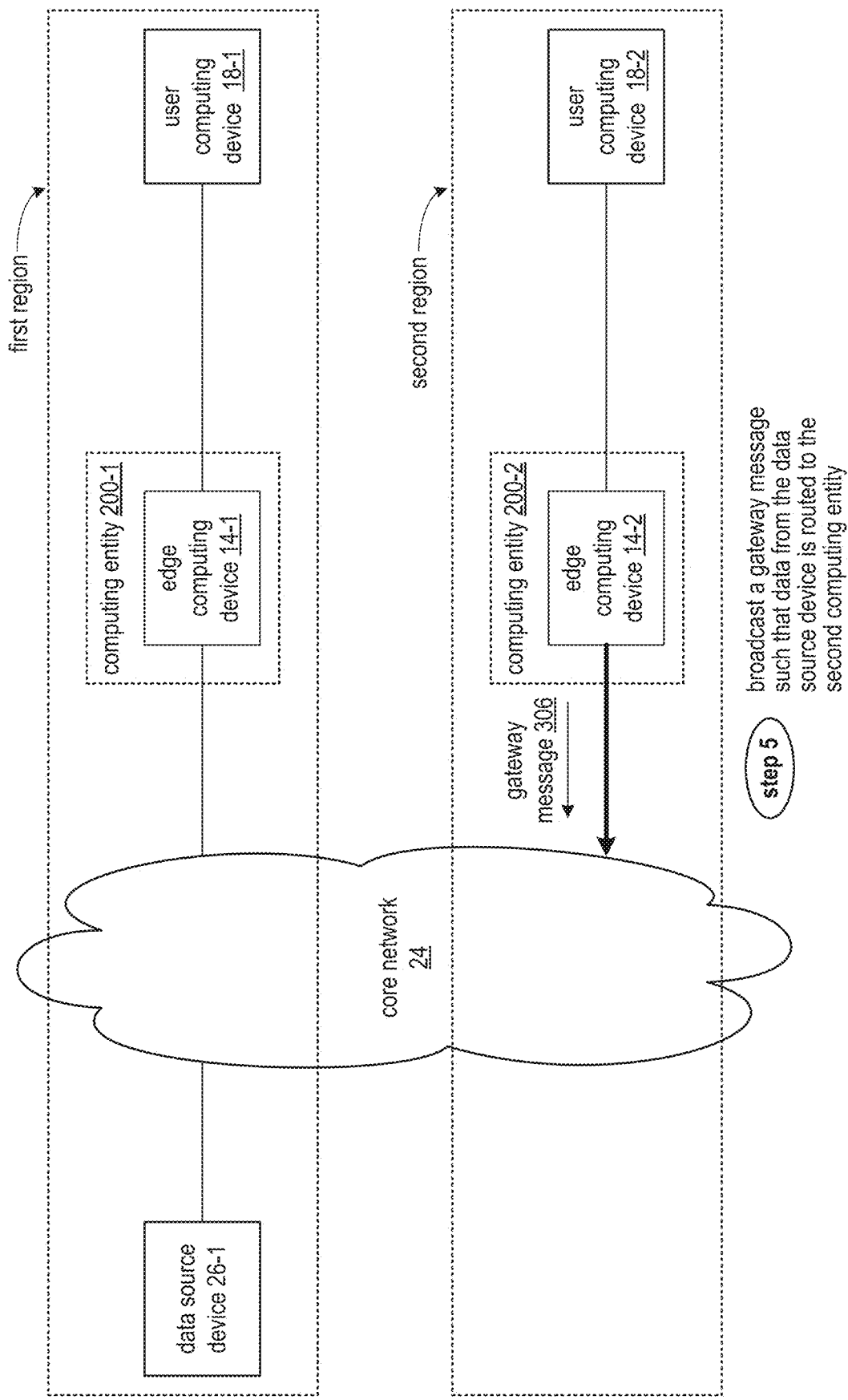

FIG. 6C further illustrates the example of the steps of the method for enforcing geographic restrictions for multitenant overlay networks where the computing entity 200-2 broadcasts a gateway message 306 (e.g., border Gateway protocol advertisement message) to the core network 24, where the gateway message 306 changes the regional data routing plan such that data from the data source device is routed to the second computing entity. The broadcasting of the gateway message 306 includes generating the gateway message 306 in accordance with a border gateway protocol based to advertise an address (e.g., an IP address range, an IP address, an IP address prefix, etc.) associated with the user computing device 18-2 to receive the data from the data source device 26-1. The user computing device 18-2 is associated with the computing entity 200-2 in accordance with the second level regional affiliation.

Having generated the gateway message 306, the computing entity 200-2 sends the gateway message 306 to a border router of the core network 24. The core network 24 subsequently routes data in accordance with the gateway message 306.

Alternatively, when the second level regional affiliation is substantially equal to the first level regional affiliation, the computing entity 200-1 broadcasts its own gateway message (e.g., a second gateway message) to the core network 24. That gateway message changes the regional data routing plan such that the data from the data source device is routed to the computing entity 200-1 (e.g., to be forwarded to the user computing device 18-1).

Figure 6D:
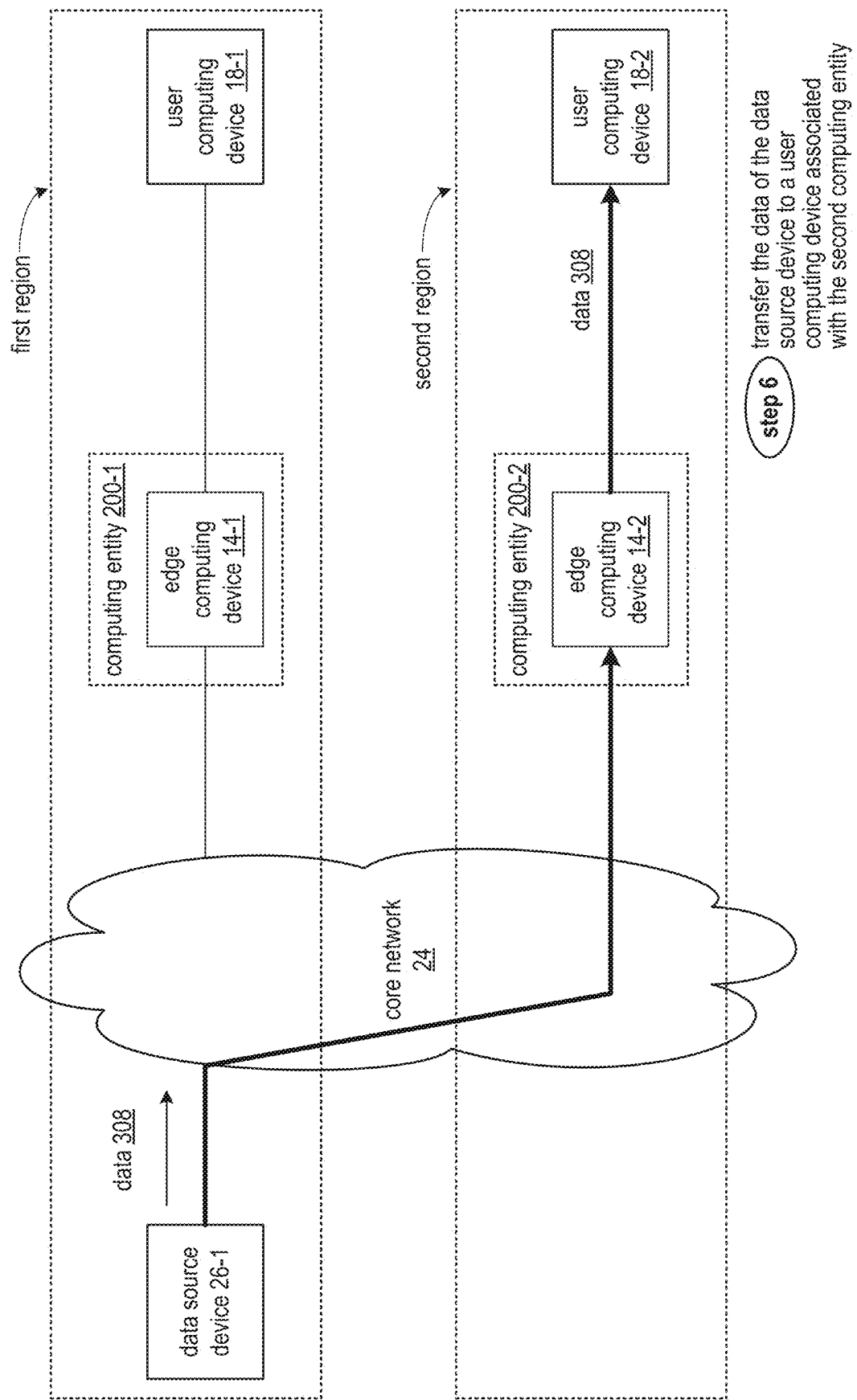

FIG. 6D further illustrates the example of the steps of the method for enforcing geographic restrictions for multitenant overlay network. When the second level regional affiliation is not substantially equal to the first level regional affiliation, the computing entity 200-2 receives, via the core network, data 308 from the data source device 26-1. Having received the data, the computing entity 200-2 transfers the data 308 from the data source device 26-1 to the user computing device 18-2 in accordance with the second level regional affiliation. For example, the IP address of the user computing device 18-2 is utilized that's in a range associated with the second level regional affiliation.

The method described above in conjunction with the processing module can alternatively be performed by other modules of the proprietary network or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the proprietary network, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
receiving, by a first computing entity via a core network in accordance with a regional data routing plan, an affiliation request from a data source device based on a first level regional affiliation of the data source device and the first computing entity;
determining, by the first computing entity, whether a second level regional affiliation of the data source device and the first computing entity is substantially equal to the first level regional affiliation; and
when the second level regional affiliation is not substantially equal to the first level regional affiliation:
identifying, by the first computing entity, a second computing entity based on the second level regional affiliation;
sending, by the first computing entity, a notification message to the second computing entity regarding the data source device being affiliated with the second computing entity; and
broadcasting, by the second computing entity, a gateway message to the core network, wherein the gateway message changes the regional data routing plan such that data from the data source device is routed to the second computing entity.

2. The method of claim 1 further comprises:
when the second level regional affiliation is substantially equal to the first level regional affiliation:
broadcasting, by the first computing entity, a second gateway message to the core network, wherein the second gateway message changes the regional data routing plan such that the data from the data source device is routed to the first computing entity.

3. The method of claim 1 further comprises:
when the second level regional affiliation is not substantially equal to the first level regional affiliation:
receiving, by the second computing entity via the core network, the data from the data source device; and
transferring, by the second computing entity, the data from the data source device to a user computing device in accordance with the second level regional affiliation.

4. The method of claim 1, wherein the determining whether the second level regional affiliation of the data source device and the first computing entity is substantially equal to the first level regional affiliation comprises one or more of:
determining the second level regional affiliation based on one or more of:
a geographic location of the data source device;
a home geographic region of the data source device;
a geographic region of the first computing entity;
a geographic region of the second computing entity;
a data storage restriction of a data type of the data from the data source device;
another data storage restriction of the data from the data source device; and
a data group associated with the data source device and a computing entity associated with the data group;
indicating that the second level regional affiliation of the data source device and the first computing entity is not substantially equal to the first level regional affiliation when the second level regional affiliation indicates that the data from the data source device is to be routed to the second computing entity; and
indicating that the second level regional affiliation of the data source device and the first computing entity is substantially equal to the first level regional affiliation when the second level regional affiliation indicates that the data from the data source device is to be routed to the first computing entity.

5. The method of claim 1, wherein the identifying the second computing entity based on the second level regional affiliation comprises one or more of:
identifying a user computing device to receive the data from the data source device, wherein the user computing device is associated with the second computing entity; and
performing an edge computing device table lookup to identify an entry that associates the second computing entity with the second level regional affiliation.

6. The method of claim 1, wherein the broadcasting the gateway message to the core network comprises:
generating the gateway message in accordance with a border gateway protocol based to advertise an address associated with a user computing device to receive the data from the data source device, wherein the user computing device is associated with the second computing entity in accordance with the second level regional affiliation; and
sending the gateway message to a border router of the core network.

7. A computing entity comprises:
an interface;
a local memory; and
a processing module operably coupled to the interface and the local memory, wherein the processing module functions to:
receive, via the interface from a core network in accordance with a regional data routing plan, an affiliation request from a data source device based on a first level regional affiliation of the data source device and the computing entity;
determine whether a second level regional affiliation of the data source device and the computing entity is substantially equal to the first level regional affiliation; and
when the second level regional affiliation is not substantially equal to the first level regional affiliation:
identify a second computing entity based on the second level regional affiliation; and
send, via the interface, a notification message to the second computing entity regarding the data source device being affiliated with the second computing entity, wherein the second computing entity broadcasts a gateway message to the core network in response to receiving the notification message, wherein the gateway message changes the regional data routing plan such that data from the data source device is routed to the second computing entity.

8. The computing entity of claim 7, wherein the processing module further functions to:
when the second level regional affiliation is substantially equal to the first level regional affiliation:
broadcast, via the interface, a second gateway message to the core network, wherein the second gateway message changes the regional data routing plan such that the data from the data source device is routed to the computing entity.

9. The computing entity of claim 7, wherein the processing module functions to send the notification message to the second computing entity regarding the data source device being affiliated with the second computing entity by:
generating the notification message to indicate that the data source device is affiliated with the second computing entity; and
transmitting, via the interface, the notification message to the second computing entity, wherein the second computing entity receives, via the core network, the data from the data source device and transfers the data to a user computing device in accordance with the second level regional affiliation.

10. The computing entity of claim 7, wherein the processing module functions to determine whether the second level regional affiliation of the data source device and the computing entity is substantially equal to the first level regional affiliation by one or more of:
determining the second level regional affiliation based on one or more of:
a geographic location of the data source device;
a home geographic region of the data source device;
a geographic region of the computing entity;
a geographic region of the second computing entity;
a data storage restriction of a data type of the data from the data source device;

another data storage restriction of the data from the data source device; and
a data group associated with the data source device and a computing device associated with the data group;
indicating that the second level regional affiliation of the data source device and the computing entity is not substantially equal to the first level regional affiliation when the second level regional affiliation indicates that the data from the data source device is to be routed to the second computing entity; and
indicating that the second level regional affiliation of the data source device and the computing entity is substantially equal to the first level regional affiliation when the second level regional affiliation indicates that the data from the data source device is to be routed to the computing entity.

11. The computing entity of claim 7, wherein the processing module functions to identify the second computing entity based on the second level regional affiliation by one or more of:
identifying a user computing device to receive the data from the data source device, wherein the user computing device is associated with the second computing entity; and
performing an edge computing device table lookup to identify an entry that associates the second computing entity with the second level regional affiliation.

12. The computing entity of claim 7, wherein the processing module further functions to send the notification message to the second computing entity regarding the data source device being affiliated with the second computing entity by:
generating the notification message to indicate that the data from the data source device is to be routed to the second computing entity; and
transmitting, via the interface, the notification message to the second computing entity, wherein the second computing entity generates the gateway message in accordance with a border gateway protocol based to advertise an address associated with a user computing device to receive the data from the data source device, wherein the second computing entity sends the gateway message to a border router of the core network, and wherein the user computing device is associated with the second computing entity in accordance with the second level regional affiliation.

13. A computer readable memory comprises:
a first memory element that stores operational instructions that, when executed by a processing module, causes the processing module to:
receive, from a core network in accordance with a regional data routing plan, an affiliation request from a data source device based on a first level regional affiliation of the data source device and a computing entity;
a second memory element that stores operational instructions that, when executed by the processing module, causes the processing module to:
determine whether a second level regional affiliation of the data source device and the computing entity is substantially equal to the first level regional affiliation; and
a third memory element that stores operational instructions that, when executed by the processing module, causes the processing module to:
when the second level regional affiliation is not substantially equal to the first level regional affiliation:
identify a second computing entity based on the second level regional affiliation; and
send a notification message to the second computing entity regarding the data source device being affiliated with the second computing entity, wherein the second computing entity broadcasts a gateway message to the core network in response to receiving the notification message, wherein the gateway message changes the regional data routing plan such that data from the data source device is routed to the second computing entity.

14. The computer readable memory of claim 13 further comprises:
a fourth memory element that stores operational instructions that, when executed by the processing module, causes the processing module to:
when the second level regional affiliation is substantially equal to the first level regional affiliation:
broadcast a second gateway message to the core network, wherein the second gateway message changes the regional data routing plan such that the data from the data source device is routed to the computing entity.

15. The computer readable memory of claim 13, wherein the processing module functions to execute the operational instructions stored by the third memory element to cause the processing module to send the notification message to the second computing entity regarding the data source device being affiliated with the second computing entity by:
generating the notification message to indicate that the data source device is affiliated with the second computing entity; and
transmitting the notification message to the second computing entity, wherein the second computing entity receives, via the core network, the data from the data source device and transfers the data to a user computing device in accordance with the second level regional affiliation.

16. The computer readable memory of claim 13, wherein the processing module functions to execute the operational instructions stored by the second memory element to cause the processing module to determine whether the second level regional affiliation of the data source device and the computing entity is substantially equal to the first level regional affiliation by one or more of:
determining the second level regional affiliation based on one or more of:
a geographic location of the data source device;
a home geographic region of the data source device;
a geographic region of the computing entity;
a geographic region of the second computing entity;
a data storage restriction of a data type of the data from the data source device;
another data storage restriction of the data from the data source device; and
a data group associated with the data source device and a computing device associated with the data group;
indicating that the second level regional affiliation of the data source device and the computing entity is not substantially equal to the first level regional affiliation when the second level regional affiliation indicates that the data from the data source device is to be routed to the second computing entity; and
indicating that the second level regional affiliation of the data source device and the computing entity is substantially equal to the first level regional affiliation when the second level regional affiliation indicates that the data from the data source device is to be routed to the computing entity.

17. The computer readable memory of claim 13, wherein the processing module functions to execute the operational instructions stored by the third memory element to cause the processing module to identify the second computing entity based on the second level regional affiliation by one or more of:
  identifying a user computing device to receive the data from the data source device, wherein the user computing device is associated with the second computing entity; and
  performing an edge computing device table lookup to identify an entry that associates the second computing entity with the second level regional affiliation.

18. The computer readable memory of claim 13, wherein the processing module functions to execute the operational instructions stored by the third memory element to further cause the processing module to send the notification message to the second computing entity regarding the data source device being affiliated with the second computing entity by:
  generating the notification message to indicate that the data from the data source device is to be routed to the second computing entity; and
  transmitting the notification message to the second computing entity, wherein the second computing entity generates the gateway message in accordance with a border gateway protocol based to advertise an address associated with a user computing device to receive the data from the data source device, wherein the second computing entity sends the gateway message to a border router of the core network, and wherein the user computing device is associated with the second computing entity in accordance with the second level regional affiliation.

* * * * *